No. 706,777. Patented Aug. 12, 1902.
E. PETRANYI.
PELLET OR TABLET MAKING APPARATUS.
(Application filed Feb. 15, 1902.)
(No Model.) 4 Sheets—Sheet 1.
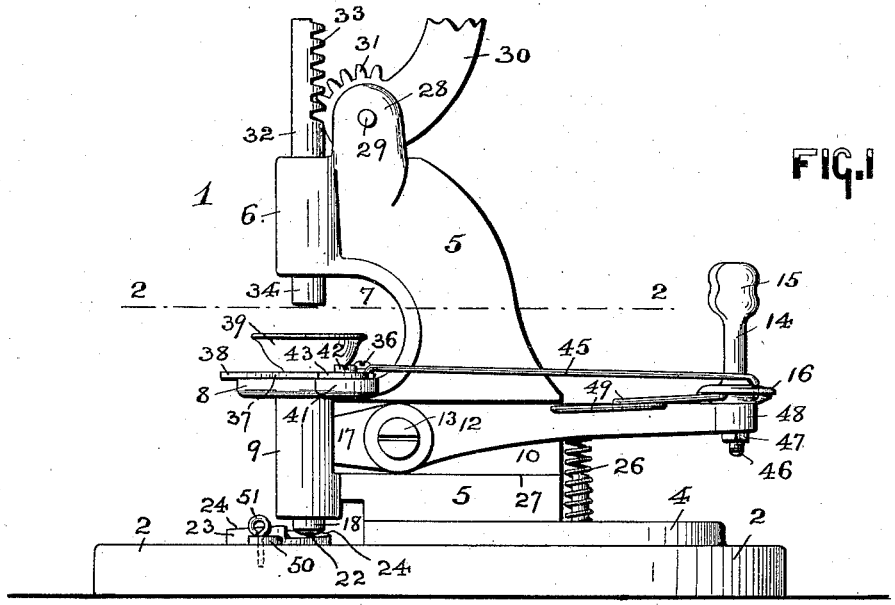
FIG.1
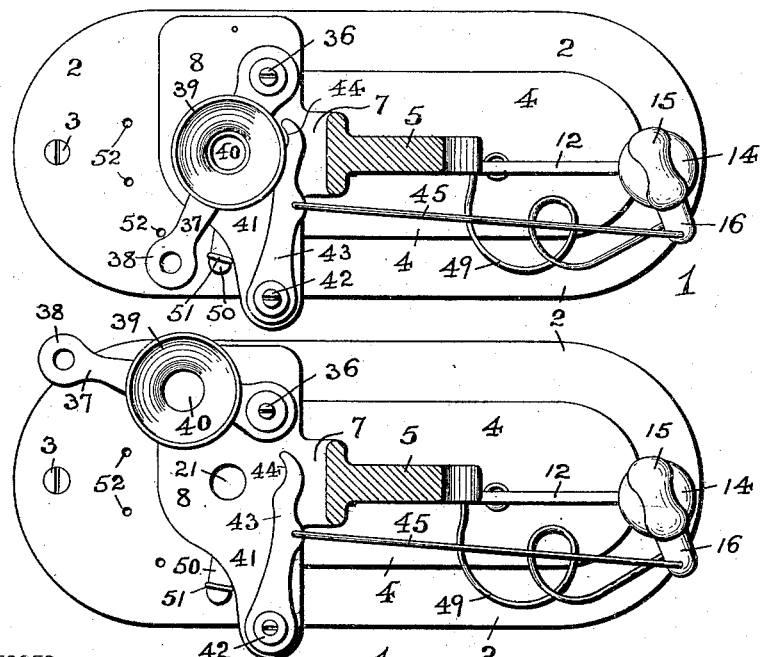
FIG.2
FIG.3
WITNESSES:
Geo. D. Richards
W. B. Fraentzel
INVENTOR:
EMERICH PETRANY
BY
Fred L. Fraentzel,
ATTORNEY No. 706,777. Patented Aug. 12, 1902.
E. PETRANYI.
PELLET OR TABLET MAKING APPARATUS.
(Application filed Feb. 15, 1902.)

(No Model.) 4 Sheets—Sheet 3.

WITNESSES:
Geo. A. Richards
N. B. Fraentzel

INVENTOR:
EMERICH PETRANYI
BY
Fred C. Fraentzel,
ATTORNEY

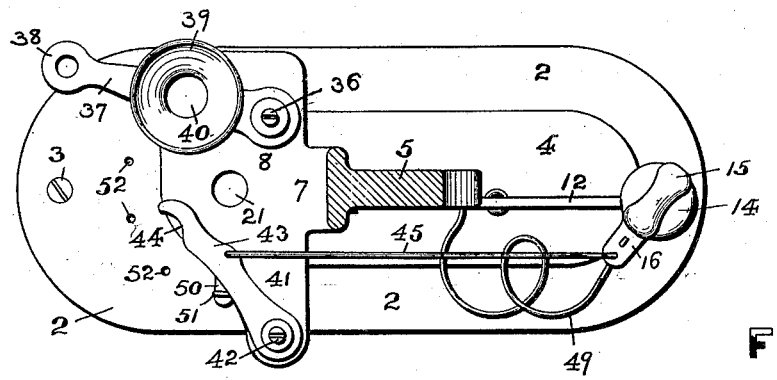
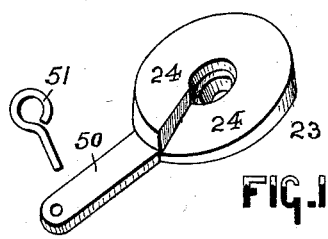
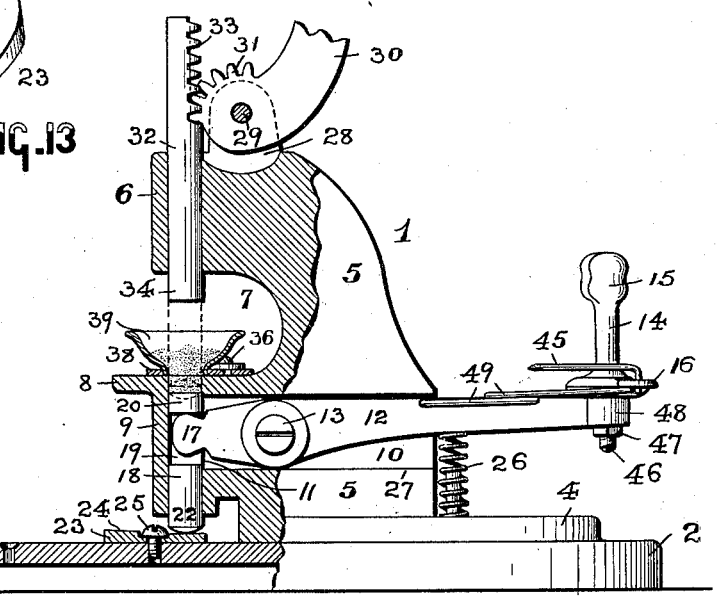
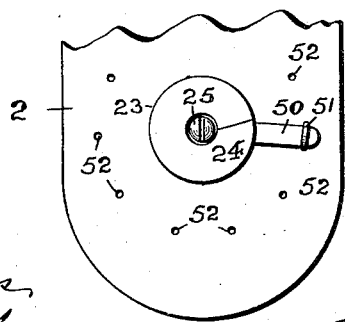

UNITED STATES PATENT OFFICE.

EMERICH PETRANYI, OF ELIZABETH, NEW JERSEY.

PELLET OR TABLET MAKING APPARATUS.

SPECIFICATION forming part of Letters Patent No. 706,777, dated August 12, 1902.

Application filed February 15, 1902. Serial No. 94,208. (No model.)

*To all whom it may concern:*

Be it known that I, EMERICH PETRANYI, a citizen of the United States, residing at Elizabeth, in the county of Union and State of New Jersey, have invented certain new and useful Improvements in Pellet or Tablet Making Apparatus; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention has reference to a novel form and construction of machine or apparatus in the form of a press for the pressing or forming of medical and other compounds, originally in the form of a powder or a plastic state, into tablets or pellets.

The present invention therefore has for its principal objects to provide a press of the character hereinafter more particularly described which shall be of a simple and inexpensive construction, the parts of which can be readily and rapidly manipulated for the production of the tablets or pellets, and, furthermore, to provide a novel construction of pellet or tablet forming press provided with means for changing the operative positions of the presser-rod which is placed beneath the plunger, and between which the compounds are pressed into tablets or pellets, for producing tablets or pellets of varying thicknesses.

The invention consists in the novel construction of pellet or tablet forming presses hereinafter more particularly set forth; and the invention consists, further, in the several novel arrangements and combinations of the various devices and their parts, all of which will be fully described in the following specification and then finally embodied in the clauses of the claim, which are appended to and form a part of this specification.

The invention is clearly illustrated in the accompanying drawings, in which—

Figure 4:
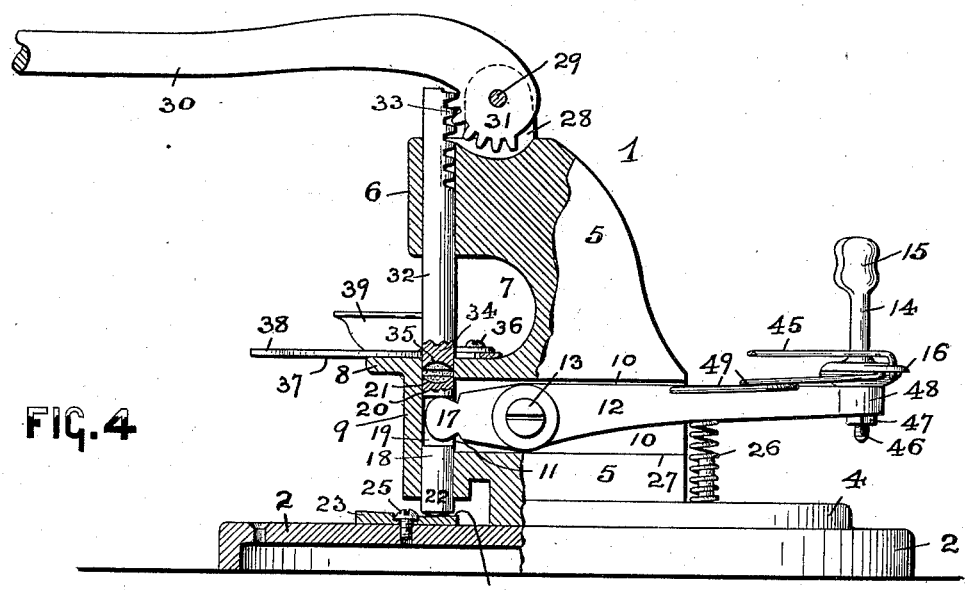
Figure 5:
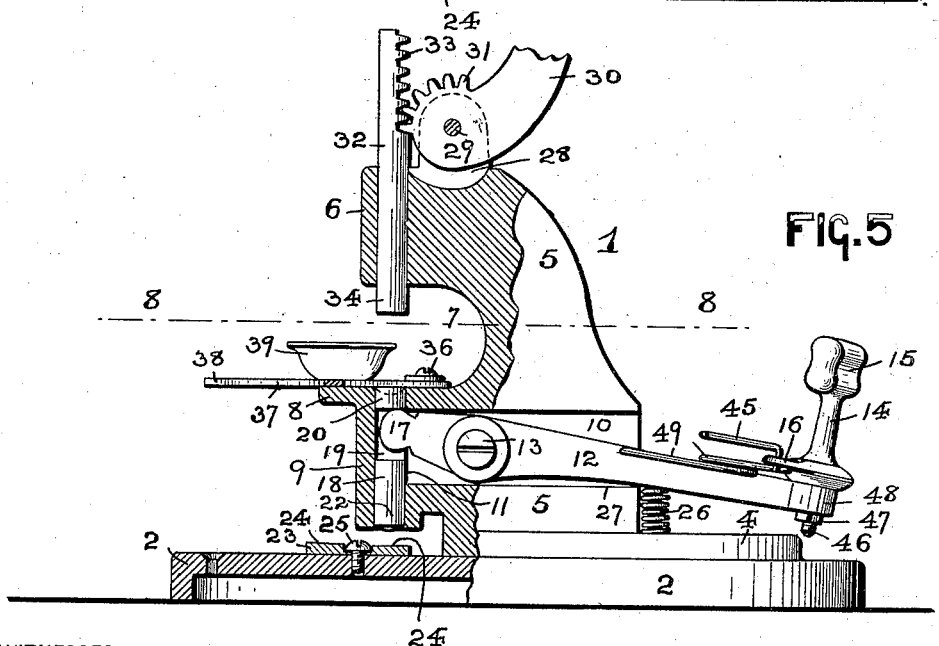
Figure 6:
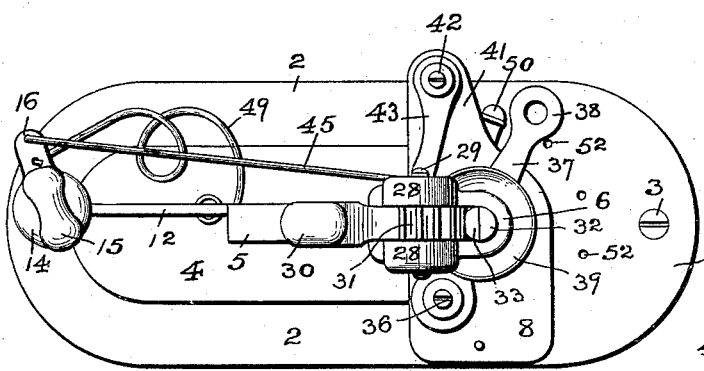
Figure 11:
Figure 7:
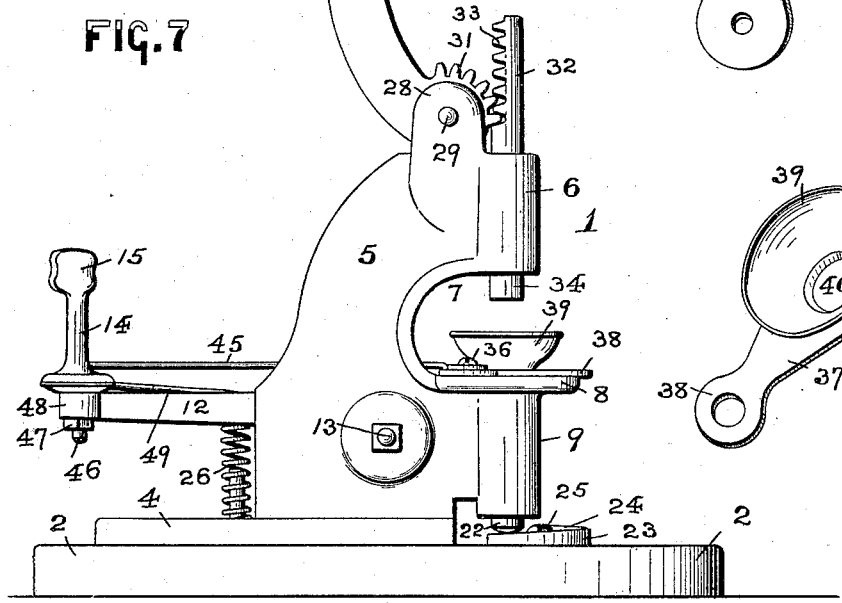
Figure 12:
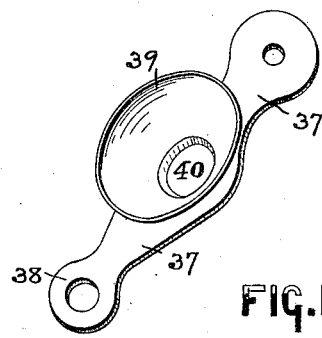

Figure 1 is a side view of a press embodying the principles of my present invention. Fig. 2 is a horizontal section taken on line 2 2 in said Fig. 1, illustrating the various parts of the press in their operative positions; and Fig. 3 is a similar section of the parts represented in said Fig. 2, but illustrating the compound-containing receptacle withdrawn to one side of the supporting-table of the press, with the remaining parts of the mechanism in their operative positions just prior to expelling a finished pellet or tablet from the press. Fig. 4 is a part longitudinal vertical section and part side elevation of the press, illustrating the various parts of the machine or apparatus in their respective positions while a pellet or tablet is being formed between the presser-rod and the plunger; and Fig. 5 is a similar view of the same parts, but illustrating the plunger and the presser-rod both in their raised positions after the finished pellet or tablet has been expelled from the apparatus. Fig. 6 is a top or plan view of the press; and Fig. 7 is a side elevation of the apparatus, illustrating the opposite side of the machine from that represented in Fig. 1 of the drawings. Fig. 8 is a horizontal section of the various parts of the press, said section being taken on line 8 8 in Fig. 5, illustrating more particularly the relative position of the compound-containing receptacle and that of a pivoted slide bar or arm for removing the finished pellet or tablet from the table of the press after the presser-rod has been raised and has expelled the finished pellet or tablet. Fig. 9 is a part vertical section and part side elevation of the parts of the press, illustrating the presser-rod and plunger and the compound-containing receptacle in their relative positions just prior to the descent of the plunger for forming or pressing into shape a pellet or tablet. Fig. 10 is a detail plan of a portion of the base of the apparatus and a cam-shaped device for varying the relative positions of the presser-rod for producing pellets or tablets of different thicknesses. Fig. 11 is a perspective view of the said slide bar or arm for removing the pellet or tablet from the table of the machine. Fig. 12 is a perspective view of the compound-containing receptacle employed with the press, and Fig. 13 is a perspective view of the said cam-shaped device for varying the relative positions of the presser-rod and a pin which is used in connection therewith.

Similar characters of reference are employed in all of the said above-described views to indicate corresponding parts.

Referring to the said figures of the drawings, the reference character 1 indicates the complete press, the same comprising a suitable base 2, which can be secured by means of suitably-disposed screws, as 3, or any other fastening means upon a table, bench, or the like. Suitably secured upon the said base 2 or made so as to form an integral part thereof is a footpiece 4, which is provided with an upwardly-extending standard or post 5, preferably of the shape and configuration represented in the several figures of the drawings. The said standard or post 5 is usually made at the top and near its front edge with a suitable guide or bearing 6 and the open space 7 directly beneath the said guide or bearing 6, substantially as illustrated. A forwardly-extending table 8 is connected with the said standard or post 5, the said table being arranged in the said open space 7 at a point below the said guide or bearing 6 in the upper portion of the said standard or post 5. Integrally connected with the said table 8 and the said standard or post 5 is a second guide or bearing 9, the opening in said guide, or rather its tubular portion, communicating with a correspondingly-arranged opening in the said table 8 and being in alinement with the tubular bearing or guiding portion in the upper guide 6. In the one side of the said standard or post 5 is a rearwardly-extending depression or wide groove 10, which connects with an opening 11 in the said lower guide or bearing 9, and thus establishes a communication with the tubular portion of the said guide or bearing 9, substantially in the manner illustrated and for the purposes to be presently described. Pivotally arranged upon a pin or screw 13 in said depression or groove 10 is an oscillating lever 12, which is provided at the rear with an upwardly-extending post 14, having a finger-piece or other suitable holding-knob, as 15, at its upper end and a suitable projection 16, as clearly illustrated. The forward end portion 17 of the said lever 12 is made as illustrated in Figs. 4, 5, and 9 and extends through the previously-mentioned opening 11 into a slot or open part 19 of a presser-rod 18, arranged in the tubular portion of the said lower guide or bearing 9. The upper end portion 20 of this rod 18, which under normal conditions is some distance below the upper surface of the table 8, as shown in Figs. 4 and 9, is made with a cup or dish shaped end 21, as represented more particularly in Fig. 4, while the lower end portion 22 of the said presser-rod 18 rests directly upon a cam-shaped surface 24 of a disk or plate 23, which is rotatably arranged upon the base 2 of the apparatus by means of a pin or screw 25. A coiled or other suitably-formed spring 26, which is arranged between the under surface of the said lever 12 and the upper surface of the footpiece 4, normally tends to force the lower end portion 22 of the presser-rod 18 directly upon the cam-shaped surface 24 of the plate 23 and also causes the said lever 12 and the rod 18 to return to their normally inoperative positions after the said lever 12 has been depressed and the pressure has been removed from the finger-piece or knob 15, hereinabove mentioned. When the said lever 12 is depressed by means of the said post 14 upon its free end, then the said presser-rod 18 is lifted in the tubular portion of the said guide or bearing 9 until the upper dish or cup shaped end of said rod 18 is brought perfectly flush with the upper surface of the table 8, the downward movement of the said lever 12 being limited by its lower edge being brought in contact with an edge 27 of the recess or groove 10, as clearly indicated in Fig. 5 of the drawings. As will be seen from an inspection of the several figures of the drawings, the said standard or post 5 is also provided with a pair of perforated ears or lugs 28, provided with a pivotal pin 29, on which is movably arranged, so as to oscillate thereon, the toothed end 31 of an operating lever or handle 30. The gear-teeth of said end 31 are in operative mesh with a rack or sprockets 33, formed on a plunger 32, the said plunger being slidably arranged in the said guide or bearing 6, as shown, and being provided at its lower end portion 34 with a cup or dish shaped face 35. Thus when the handle or lever 30 is in its raised position (indicated in Figs. 1, 5, 7, and 9) then will the said lower end portion 34 of the said plunger 32 be raised above the upper face of the table 8; but when the said handle or lever 30 is lowered, as indicated in Fig. 4, then the cup or dish shaped end of the plunger is made to enter the opening in the said table 8. Pivotally arranged upon a pin or screw 36 on said table 8 is a lever or arm 37, which is made with a finger-piece or handle portion 38 at its free end and has a funnel-shaped receptacle 39, provided with an open bottom 40. The said table 8 is also provided with a suitable extension 41, to which is pivotally connected, by means of a pin or screw 42, a suitably-constructed slide bar or arm 43, which is preferably provided at or near its free end with a curved push-off end, as 44. This slide-bar is operatively connected with the extension 16 on the post 14 by means of a connecting rod or link 45, and the said post 14 being pivotally held by means of a screw portion 46 and a nut 47 in an eye 48 on said lever 12 the said slide bar or arm 43 can be moved from its normal positions (indicated in Figs. 2 and 3) to the position represented in Fig. 8 by means of the connecting rod or link 45, when the said post 14 is turned in the said eye 48 of the lever 12 in the manner and for the purposes to be hereinafter fully described. A suitably-constructed and bent spring, as 49, having its respective ends attached to a portion of the said lever 12 and to the said extension 16, is employed for returning the said slide bar or arm 43 from the position shown in said Fig. 8 to its positions represented in Figs. 2 and 3. The previously-mentioned cam disk or plate 23 is also made with an extension or a projecting portion 50, provided with a suitable hole or perforation for the reception of a pin 51 and the lower portion of the said pin being capable of arrangement in any one of a series of suitably-disposed holes or perforations 52 in the said base 2, as shown, whereby when the said cam disk or plate has been turned into an adjusted position, according to the thickness of the pellet or tablet desired, the said pin can be used for holding or retaining the said disk in its adjusted and immovable position until the said pin is again removed and the disk 23 turned to some other position. In this manner, as will be clearly evident, by adjusting or turning the said cam disk or plate 23 to the desired position, according to the required thickness of the pellet or tablet which is to be formed, the said presser-rod 18 can be brought in the desired position, and different thicknesses of pellets or tablets can be made by bringing the upper dish or cup shaped end of the rod 18 closer to the upper surface of the table 8 or farther away from the said upper surface of the table, according to whether a thin or a thick pellet or tablet is desired.

Having thus described the general construction and the arrangements of the various devices and parts of the pellet or tablet making press, I will now set forth the manner of its operation in making the pellets or tablets.

Suppose the said cam-disk 23 has been fixed in its adjusted position upon the base 2, according to the thickness of the pellet or tablet desired, and that the said funnel-shaped receptacle 39 has been filled with the compound from which the pellets or tablets are to be formed, the said compound being usually in the form of a powder. The said receptacle 39 is then brought from the position indicated in Fig. 3 directly in the position indicated in Fig. 2 by sliding it along the table 8, bringing the open bottom of the said receptacle over the opening in the table. Immediately the tubular space above the cup or dish shaped end of the presser-rod 18 is filled with the required quantity of the loose powder. The said receptacle 39 is then again returned or slid back to its initial position, (indicated in Fig. 3,) and the plunger 32 is lowered from its position represented in Figs. 1, 7, and 9 down upon the powder which has been placed above the presser-rod 18, as clearly illustrated in Fig. 4 of the drawings. This action fully compresses the powder or other composition into a suitable and sufficiently-hard pellet or tablet of the proper form. When the said plunger is lifted from above the said pellet or tablet just made by returning the lever or arm 30 from its operated position in Fig. 4 to its normally inactive position, (shown in Fig. 1,) then by means of a downward pressure upon the finger-piece or knob 15 of the post 14 the lever or arm 12 is lowered, and its end 17 raises the presser-rod 18 sufficiently to expel the finished pellet or tablet above the upper surface of the table 8. Almost at the same time the operator has sufficiently turned the said post in the manner above stated to cause a sliding motion of the slide bar or arm 43, whereby the said pellet or tablet is swept from the said table 8 into a box or other suitable receptacle to be placed along the side of the table. After the spring 49 has returned the said slide bar or arm 43 to its initial position (represented in Figs. 2 and 3) and the spring 26 has caused the lever 12 and the parts operated by said lever to assume their normally inoperative positions then the compound-containing receptacle 39 is again brought directly over the hole in the table 8, and the various steps of making and ejecting the pellet or tablet are again proceeded with.

It will be clearly evident from the above description of my invention that I have devised a simple and efficient as well as a useful device for the purposes stated and which can be rapidly and easily manipulated.

I am fully aware that various changes may be made in the general arrangements and combinations of the devices and their parts without departing from the scope of my present invention. Hence I do not limit my invention to the exact arrangements and combinations of the devices and their parts as described in the accompanying specification and as illustrated in the drawings, nor do I confine myself to the exact details of the construction of the said parts.

Having thus described my invention, what I claim is—

1. In a pellet or tablet forming device, the combination, with a base and a standard, of a table connected with said standard having a plunger-receiving opening, a guide directly beneath said table having its guiding portion communicating with said opening in the table, a presser-rod movably arranged in said guide, a plunger provided with means for forcing its lower end down into the said opening in the table, and means for causing a sliding movement of said presser-rod, an arm pivotally arranged on said table, a finger-piece connected with said arm, a funnel-shaped compound-containing receptacle on said arm provided with an open bottom for delivering a predetermined quantity of the compound into the opening in said table, and a slide-arm pivotally arranged on said table adapted to be slid laterally across the opening in said table for removing the finished pellet or tablet, substantially as and for the purposes set forth.

2. In a pellet or tablet forming device, the combination, with a base and a standard, of a table connected with said standard having a plunger-receiving opening, a guide directly beneath said table having its guiding portion communicating with said opening in the table, a presser-rod movably arranged in said guide, a plunger provided with means for forcing its lower end down into said opening in the table, and means for causing a sliding movement of said presser-rod, consisting, essentially, of a pivoted lever on said standard, having a finger-piece at or near its one end and said lever having its opposite end in lifting engagement with said presser-rod, an arm pivotally arranged on said table, a finger-piece connected with said arm, a funnel-shaped compound-containing receptacle on said arm provided with an open bottom for delivering a predetermined quantity of the compound into the opening in said table, and a slide-arm pivotally arranged on said table adapted to be slid laterally across the opening in said table for removing the finished pellet or tablet, substantially as and for the purposes set forth.

3. In a pellet or tablet forming device, the combination, with a base and a standard, of a table connected with said standard having a plunger-receiving opening, a guide directly beneath said table having its guiding portion communicating with said opening in the table, a presser-rod movably arranged in said guide, a plunger provided with means for forcing its lower end down into the said opening in the table, means for causing a sliding movement of said presser-rod, and an adjusting means on said base on which the lower end of said presser-rod rests, capable of raising and lowering the relative positions of said presser-rod with respect to the upper surface of said table, an arm pivotally arranged on said table, a finger-piece connected with said arm, a funnel-shaped compound-containing receptacle on said arm provided with an open bottom for delivering a predetermined quantity of the compound into the opening in said table, and a slide-arm pivotally arranged on said table adapted to be slid laterally across the opening in said table for removing the finished pellet or tablet, substantially as and for the purposes set forth.

4. In a pellet or tablet forming device, the combination, with a base and a standard, of a table connected with said standard having a plunger-receiving opening, a guide directly beneath said table having its guiding portion communicating with said opening in the table, a presser-rod movably arranged in said guide, a plunger provided with means for forcing its lower end down into the said opening in the table, means for causing a sliding movement of said presser-rod, and an adjusting means on said base on which the lower end of said presser-rod rests, capable of raising and lowering the relative positions of said presser-rod with respect to the upper surface of said table, consisting, of a rotatably-arranged cam-disk provided with a cam-shaped face, and means connected with said disk for holding said disk in its variously-adjusted positions, an arm pivotally arranged on said table, a finger-piece connected with said arm, a funnel-shaped compound-containing receptacle on said arm provided with an open bottom for delivering a predetermined quantity of the compound into the opening in said table, and a slide-arm pivotally arranged on said table adapted to be slid laterally across the opening in said table for removing the finished pellet or tablet, substantially as and for the purposes set forth.

5. In a pellet or tablet forming device, the combination, with a base and a standard, of a table connected with said standard having a plunger-receiving opening, a presser-rod and a plunger both connected with the said standard, and a compound-containing receptacle slidably arranged upon said table, said receptacle being provided with an opening in its bottom for depositing a certain quantity of the compound through the opening in the table and directly upon the end of the presser-rod, means connected with said plunger for forcing its lower end down into the said opening in the table, and means for causing a sliding motion of said presser-rod, consisting, essentially, of a lever pivoted to said standard, having a finger-piece at or near its one end and said lever having its opposite end in lifting engagement with said presser-rod, substantially as and for the purposes set forth.

6. In a pellet or tablet forming device, the combination, with a base and a standard, of a table connected with said standard having a plunger-receiving opening, a guide directly beneath said table having its guide portion communicating with the opening in the table, a presser-rod movably arranged in said guide, a plunger provided with means for forcing its lower end down into the said opening in the table, a slide-arm on said table for removing the finished pellet or tablet, and means for causing a sliding movement vertically of said presser-rod and a sliding movement laterally on said table of said slide-arm, consisting, essentially, of a lever pivoted to said standard, said lever having its one end in lifting engagement with said presser-rod, a post rotatively arranged at or near the opposite end of said lever, and a connecting-link between said post and said slide-arm, substantially as and for the purposes set forth.

7. In a pellet or tablet forming device, the combination, with a base and a standard, of a table connected with said standard having a plunger-receiving opening, a guide directly beneath said table having its guide portion communicating with the opening in the table, a presser-rod movably arranged in said guide, a plunger provided with means for forcing its lower end down into the said opening in the table, a slide-arm on said table for removing the finished pellet or tablet, and means for causing a sliding movement vertically of said presser-rod and a sliding movement laterally on said table of said slide-arm, consisting, essentially, of a lever pivoted to said standard, said lever having its one end in lifting engagement with said presser-rod, a post rotatively arranged at or near the opposite end of said lever, and a connecting-link between said post and said slide-arm, and a set of springs 26 and 49 connected with said lever for returning said lever and the parts operated by said lever to their normally inoperative positions, substantially as and for the purposes set forth.

8. In a pellet or tablet forming device, the combination, with a table having an opening, and means for pressing a compound into a pellet or tablet, of an arm pivotally arranged on said table, a finger-piece connected with said arm, a funnel-shaped compound-containing receptacle on said arm provided with an open bottom for delivering a predetermined quantity of the compound into the opening in said table, and a slide-arm pivotally arranged on said table adapted to be slid laterally across the opening in said table for removing the finished pellet or tablet, substantially as and for the purposes set forth.

9. The herein-described pellet or tablet making device, consisting, essentially, of a base, a standard, and a table connected with said standard having a plunger-receiving opening, a tubular guide 6 connected with said standard, a plunger movably arranged in said guide 6, a second guide 9 directly beneath said table having its guide portion in communication with the opening in said table, a presser-rod movably arranged in said guide 9, a pivotally-arranged lever on said standard having one end in lifting engagement with said presser-rod for bringing the upper end of said presser-rod flush with the upper surface of said table, an arm 37 pivotally arranged on said table, a finger-piece connected with said arm 37, a funnel-shaped compound-containing receptacle on said arm 37 provided with an open bottom for delivering a predetermined quantity of the compound into the opening in said table, and a slide-arm 43 pivotally arranged on said table adapted to be slid laterally across the opening in said table for removing the finished pellet or tablet, substantially as and for the purposes set forth.

In testimony that I claim the invention set forth above I have hereunto set my hand this 13th day of February, 1902.

EMERICH PETRANYI.

Witnesses:
 FREDK. C. FRAENTZEL,
 W. B. FRAENTZEL.